May 16, 1933. W. A. BOHN 1,909,748
BEARING
Filed May 18, 1932
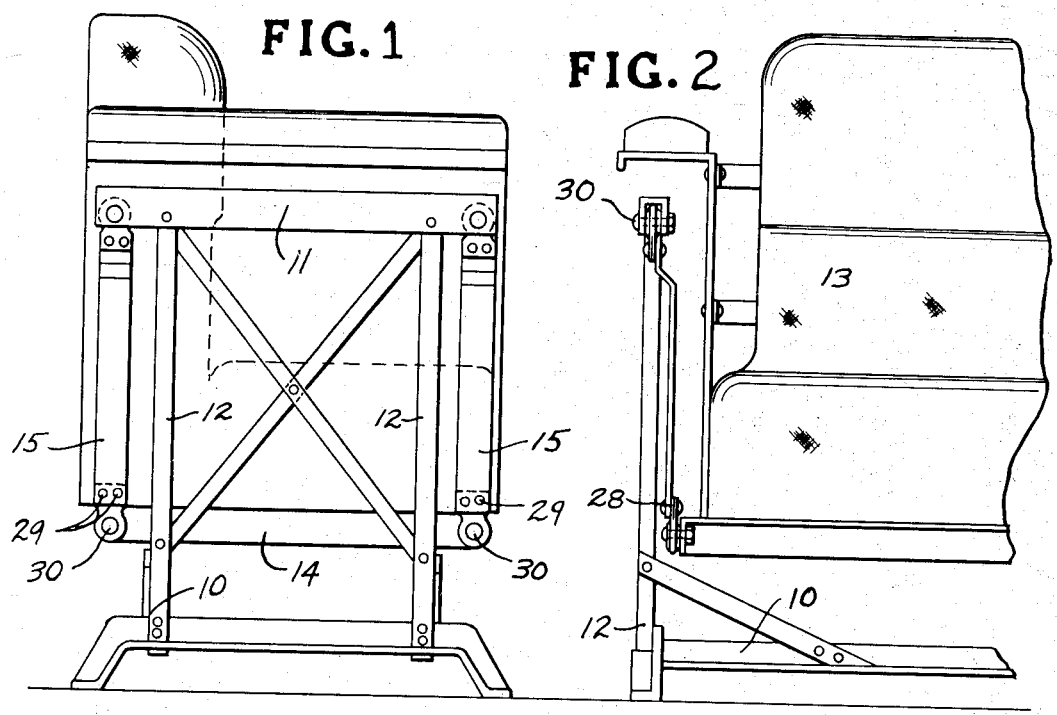
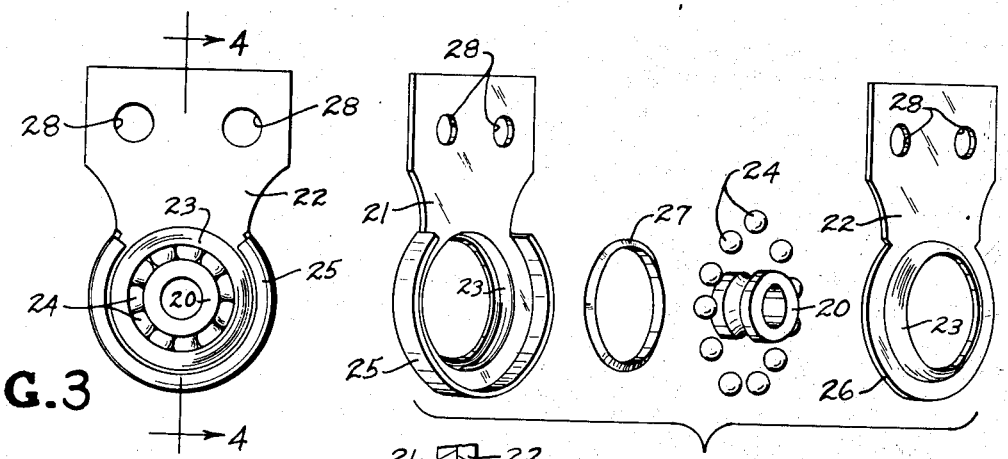

Patented May 16, 1933

1,909,748

UNITED STATES PATENT OFFICE

WALTER A. BOHN, OF LAKEWOOD, OHIO, ASSIGNOR TO THE MASTER PRODUCTS COMPANY, OF CLEVELAND, OHIO, A CORPORATION OF OHIO

BEARING

Application filed May 18, 1932. Serial No. 612,071.

This invention relates to bearings and particularly to those of relatively small size that are adapted to support an article that is subjected only to slight oscillatory motion during use. Bearings of this type are used in connection with the operation of porch gliders for supporting seats upon a stationary frame.

In my pending application, Serial No. 547,391, filed June 27th, 1931, I have disclosed a simple and inexpensive bearing construction which, briefly, comprises a cylindrical inner race, an outer race and ball-bearings disposed therebetween. The outer race comprises a pair of flat plates, each having a portion thereof flared outwardly to provide half of the race, and the flat plates are made from metal stampings and are provided with means for attaching the bearing to its support. The plates may be secured together by a crimping operation.

This device has been very satisfactory in operation, but some difficulty has been encountered in providing a hardened wearing surface for the outer race, as it is impractical to harden the plates before the crimping operation.

The present invention comprises an improvement on the invention disclosed in my prior application, and the general object of the present invention is to provide a simple bearing construction of the general type heretofore described, in which the outer race is provided with a hardened wearing surface in an inexpensive manner.

Referring now to the drawing, Fig. 1 is an elevation of a porch glider embodying my invention; Fig. 2 is a front elevation of the porch glider shown in Fig. 1; Fig. 3 is a front view of the bearing unit on a larger scale and removed from the glider; Fig. 4 is a section taken along the lines 4—4 of Fig. 3; Fig. 5 is a perspective view of the various parts of the bearing unit, and Fig. 6 shows a portion of Fig. 4 on an enlarged scale.

I have shown my device in connection with a porch glider, but it is to be understood that it can be used in connection with any device wherein the bearing is intended to be attached to one member and to support another, which is journalled therein. As applied to a porch glider the stationary portion of the glider support is illustrated as a frame 10, which has a top cross bar overhanging the vertical members 12, while the movable portion 13 is shown as having a cross bar 14 which is connected to the bar 11 by links 15. The bearing units which embody my invention serve as the connecting means between the links and the bars 11 and 14, respectively.

As illustrated in Figs. 3 to 5, each bearing unit may comprise an inner race 20 and a pair of attaching plates 21 and 22, respectively. These plates each have enlarged portions 23, and together form parts of the outer ball race for the bearing members 24. To hold the plates in contiguous relationship I have shown a preferred arrangement wherein the plate 21 has a flange portion 25, which extends around the lower marginal edge thereof, and which is adapted to be crimped over the corresponding edge 26 of the member 22.

In order to provide a hard wearing surface for the outer ball race and to avoid the difficulty encountered in hardening the pressed metal plates 21 and 22, I have provided a wearing member 27, which is preferably a hardened steel ring, either endless or split, and which may have a triangular cross-section.

As shown in Fig. 6, the inner surface of the ring is preferably flat, and the thickness of the ring may be considerably less than the diameter of the ball. The center line of the ring preferably lies in the plane defined by the contiguous surfaces of the attaching plates. The outer portion of the ring is securely gripped by the adjacent curved portions 23a of the plates and is thus automatically centered by the assembling operation and held against rotation. The ring preferably projects beyond the adjacent surfaces of the attaching plates, so that all of the radial thrust on the bearing will be taken by the ring, while the attaching plates will function to hold the balls in place and to resist axial thrusts. There may be a small amount of clearance between the edges 23b of the outwardly flared portions and the balls.

It will be seen that the ring provides a hard wearing surface which takes substantially all of the load of the bearing in ordinary use, while the attaching plates merely serve to hold the balls in place and to take occasional axial loads. Thus, there will be no substantial wear on the attaching plates and they can be made of relatively soft pressed metal.

To permit the unit to be attached conveniently to its support I have shown the plates as having openings 28, which are brought into registration when the unit is assembled, and which serve to hold the unit in engagement with its support, as by rivets or bolts 29. As applied to a porch glider, a bearing unit is rigidly connected to each end of the links 15, while connecting pins 30 extend through the inner races and connect the bearing units to the cross bars 11 and 14, respectively.

From the foregoing description of a preferred form of my invention, it will be seen that I have provided a durable bearing, having a minimum number of parts. The attaching plates may be made of inexpensive metal stampings and require no hardening or further treatment as substantially all of the wear will be taken by the hardened metal ring. It will also be seen that my bearing may be easily assembled, because of the fact that the ring is automatically centered and held in proper position by the attaching plates.

I claim:

1. A bearing unit, comprising an inner race, an outer race and ball-bearing members therebetween, the outer race comprising a pair of contiguous sheet metal similarly shaped plates having outwardly flared portions adapted to resist the axial thrust and a single wear-resisting member disposed within said outwardly flared portions, and adapted to resist radial thrust.

2. A bearing unit, comprising in combination, an inner race, an outer race and ball-bearings disposed therebetween, the outer race comprising a hardened wear-resisting annular ring having a substantially triangular cross-section, the base of the triangle forming the inner surface of the ring and the apex of the triangle extending outwardly, and a pair of similarly shaped flat plates having annular flared portions, said ring being disposed within said annular flared portions and held therebetween and projecting inwardly beyond the adjacent surfaces of said flared portions.

3. A bearing unit, comprising an inner race, an outer race and ball-bearing members therebetween, the outer race comprising a pair of contiguous plates having outwardly flared portions adapted to resist the axial thrusts, and a ring having a substantially triangular cross-section disposed within said outwardly flared portions, and adapted to resist radial thrusts, a portion of the marginal edge of one of the plates being crimped over the other plate and constituting the means for fastening them together.

In testimony whereof, I hereunto affix my signature.

WALTER A. BOHN.